May 16, 1939.   J. W. ALTMYER   2,158,813
VEHICLE GUARD
Filed June 10, 1937
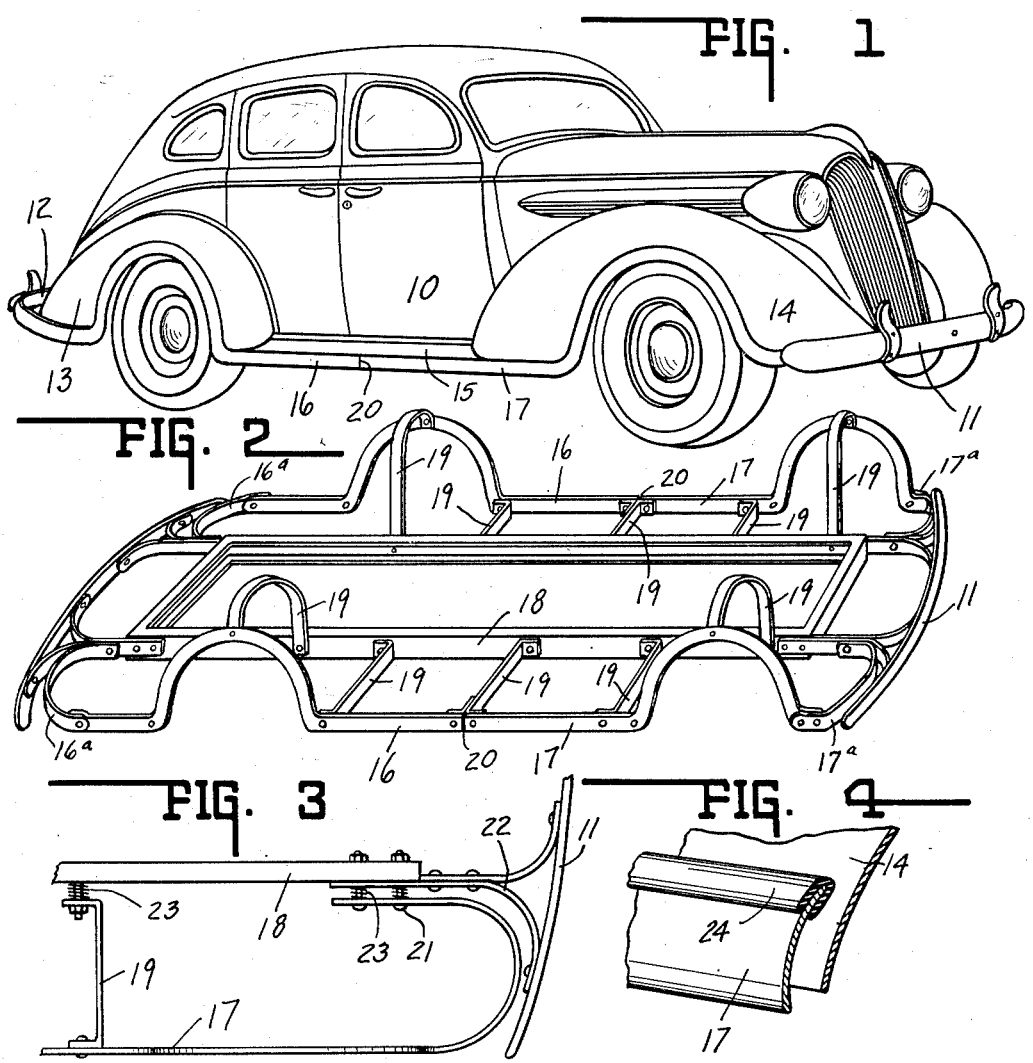
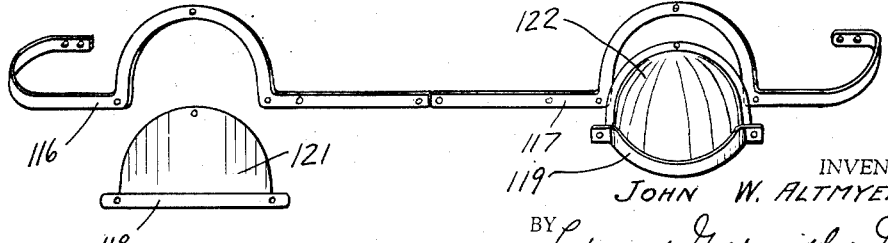
INVENTOR.
JOHN W. ALTMYER.
BY Lockwood Goldsmith & Galt
ATTORNEYS.

Patented May 16, 1939

2,158,813

UNITED STATES PATENT OFFICE 2,158,813

VEHICLE GUARD

John W. Altmyer, Omaha, Nebr.

Application June 10, 1937, Serial No. 147,419

1 Claim. (Cl. 293—57)

This invention relates to a vehicle guard, particularly adaptable for automobiles, both in respect to fender protection and decorative trimming.

The principal purpose of the invention is to provide suitable means for protecting the fenders of an automobile against dents and scratches which have become so prevalent, due to congested traffic and public garages.

The invention consists in providing a protective, as well as decorative, bar extending from end to end of its chassis frame along each side of the automobile adjacent the free edges of the fenders and running board. Thus, the several sections of the protective bar and bumpers completely surround the automobile, so that it is virtually steel bound.

One feature of the invention resides in the mounting of the bar upon the vehicle frame and its connection with the front and rear bumpers.

Other features of the invention will be understood from the accompanying drawing and the following description and claim.

Fig. 1 is a perspective view of an automobile showing the protective bar mounted on one side thereof. Fig. 2 is a perspective view of the vehicle chassis frame with the bar secured thereto. Fig. 3 is a detailed view showing a resilient connection between the chassis frame and bar. Fig. 4 is a perspective view showing a section of the bar applied to the fender. Fig. 5 is a modified form showing it applied to a vehicle arranged to receive fender disks covering the wheels, said disks being shown in removed position.

In the drawing there is illustrated a vehicle 10 having a front bumper 11 and a rear bumper 12. There is also provided the usual rear fender 13 and front fender 14 connected by the running board 15.

Mounted adjacent the outer free edges of the rear fender and the rear portion of the running board and in protective relation thereto, there is provided a protective bar section 16. Similarly associated with the front fender and the front portion of the running board there is a protective bar section 17. The section 16 may be secured to the rear of the chassis frame or bumper through a connecting arm 16a, and the section 17 to the front of the chassis frame or associated bumper through the connecting arm 17a.

The sections are secured directly to the chassis frame 18 intermediate its end by a series of spaced supporting arms 19. The adjacent ends of the sections are secured together at 20.

As illustrated in Fig. 3, one form of mounting may consist in curving the forward or rear end of the protective bar inwardly so that its inwardly extending free end may be secured at 21 to the chassis frame 18. The protective bar may be slightly spaced from the fender and running board and separated from the supporting arms 19 by intermediate compression springs 23 so as to provide some give or resiliency in event of impact. In this connection, for the protection of the fenders, said bar may be provided along its upper or inner edge with a rubber or fabric binding strip 24, as shown in Fig. 4, so that in event of collision or impact, the bar would not scratch or mar the finish of the fender.

As illustrated in the modified form of Fig. 5, the section 116 of the protective bar may be provided with a detachable section 118 extending across the rear wheel. Likewise, the section 117 of the protective bar may be provided with a detachable outwardly extending arcuate section 119 to clear the turning movement of the front wheel. With this arrangement, there may or may not be provided a rear wheel guard 121 and an outwardly curved front wheel guard 122 secured to the sections 118 and 119, respectively.

The protective bars extending along each side of the chassis frame are readily adaptable for use as a radio antenna, and for this purpose their supporting connections may be suitably insulated from the frame.

The invention claimed is:

The combination with an automobile having front and rear bumpers, wheel fenders and an intermediate running board supported upon a chassis frame, of protective bars for said fenders and running board extending adjacent the edges thereof, the front and rear ends of said bars extending to a position adjacent said bumpers and the extreme ends being curved inwardly around the end of the fenders to provide a spring or yielding formation, compression springs interposed between said protective bars and frame, and means for securing the free ends of the curved portions of said bars to the automobile independently of the horizontal bumper bars.

JOHN W. ALTMYER.